March 4, 1947.  P. M. FARMER  2,416,870
ARTICLE ASSEMBLY SYSTEM FOR STORES
Filed June 16, 1943   2 Sheets-Sheet 1
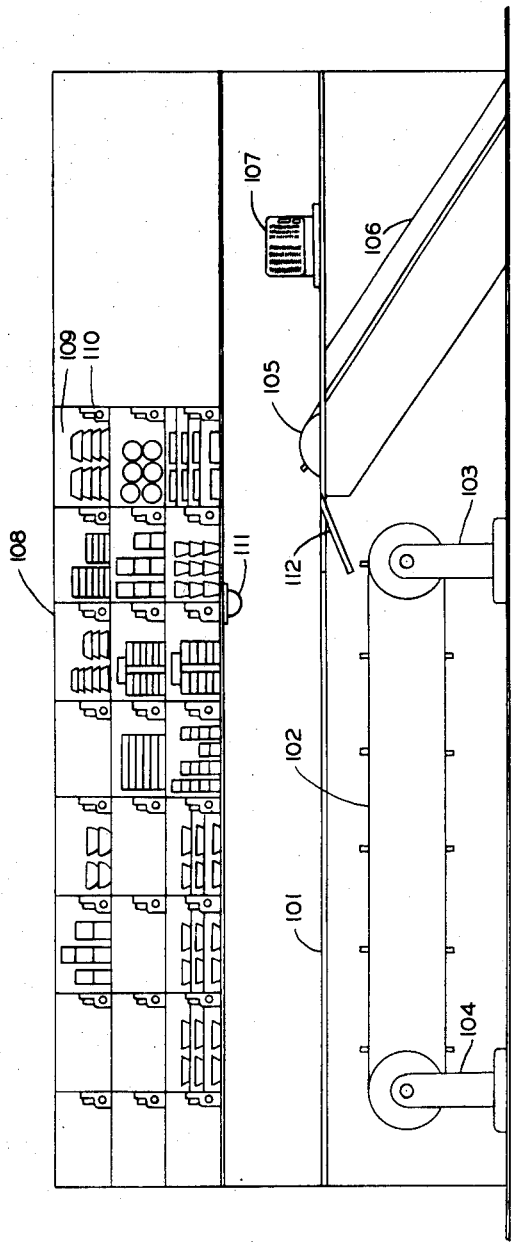
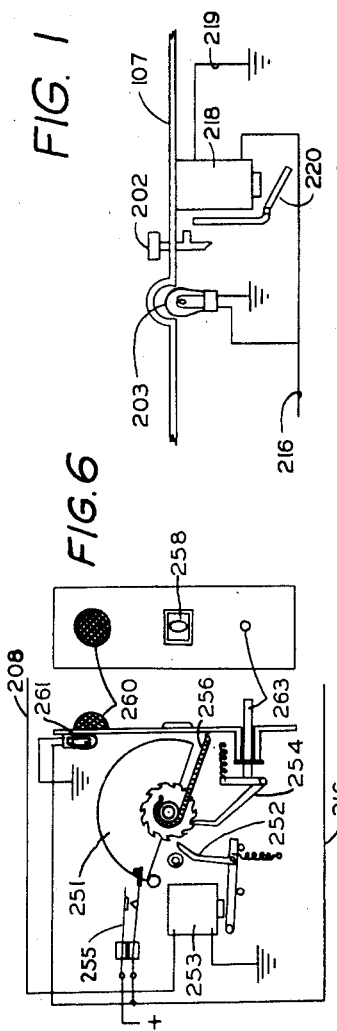
INVENTOR.
P. M. Farmer
BY Earl R. Evans
Attorney March 4, 1947.  P. M. FARMER  2,416,870
ARTICLE ASSEMBLY SYSTEM FOR STORES
Filed June 16, 1943  2 Sheets-Sheet 2

INVENTOR.
P. M. Farmer
BY Earl R. Evans
Attorney

Patented Mar. 4, 1947

2,416,870

UNITED STATES PATENT OFFICE 2,416,870

ARTICLE ASSEMBLY SYSTEM FOR STORES

Paul M. Farmer, Madison, N. J.

Application June 16, 1943, Serial No. 491,012

16 Claims. (Cl. 186—1)

This invention pertains to an improved system and apparatus for selecting and assembling articles from stock in filling orders for customers in a retail store, for example, and also recording data relative to the items selected, prices, et cetera.

The present invention is a modification or improvement of those described in my prior Patents Nos. 2,276,293 and 2,276,294 dated March 17, 1942, and my copending patent application Ser. No. 434,550 filed March 13, 1942. It may further be characterized as particularly suitable for expediting the filling of customers' orders in a retail store and minimizing the possibility of mistakes in such transactions, although obviously it is not limited to this specific use.

In mechanized order handling systems, a special problem is presented if the articles to be supplied include bulky or loose units, or fragile articles which are not packaged to withstand ordinary handling. In a food market, for example, certain products such as pastries with soft fillings and eggs require careful handling even when packaged, and these as well as bottled drinks and loose unpackaged articles cannot readily be selected and delivered from stock by a mechanical system. The same difficulty is encountered with heavy, bulky packages such as sacks of flour or potatoes. These items are preferably dispensed manually and by the proposed methods this may be accomplished while the order is being paid for.

One object of the invention is to provide an improved system which combines mechanical dispensing of ordinary packaged articles on the one hand and manual selection of special items such as those referred to on the other hand. The improved system according to the invention is so arranged that the manually dispensed items are directly and immediately associated with the concurrently requisitioned mechanically dispensed items, thus saving time and preventing mistakes in the handling of orders.

Another object of the invention is to provide an improved article-assembly system of the class described which reduces the mental effort required of the order clerk by eliminating any necessity for him to discriminate between the items which are to be manually dispensed and those which are to be mechanically dispensed, during the actuation of the control apparatus. This overcomes the need for a highly trained and experienced order clerk, and speeds up service.

Another object of the invention is to simplify the handling of manually dispensed articles since the employee handling such articles need have no knowledge of the names, numbers or even the location of the requisitioned items. This further simplifies the work of the delivery clerk who assembles the manually dispensed articles, since the wanted articles are automatically annunciated by the selective control system.

A further object of the invention is to provide a system for expeditiously handling both mechanically dispensed articles and other articles which, though capable of being dispensed mechanically, may be called for so infrequently or may be handled on such a temporary basis as not to justify mechanical dispensing equipment. This feature reduces the amount of equipment required in many article assembly systems and saves the time required for the installation of such equipment.

A still further object of the invention is to provide, in systems of the character described, an interlock between the annunciator signal or other component of the manual dispensing system and the mechanical dispensing system, whereby the latter may be restrained until manually dispensed items are collected to thereby insure that maximum efficiency is attained and the items of different orders are kept separate.

For a better understanding of the invention, reference may be had to the accompanying drawings illustrating preferred embodiments of the same and in which Fig. 1 is a rear elevation of the delivery station of a mechanized order handling system according to the invention, and including storage compartments for articles which are to be manually dispensed.

Fig. 3 is a similar view detailing certain mechanical and electrical features of the system shown in Figs. 1 and 2.

Figs. 5 and 6 are schematic and a front elevation, respectively, of a multi-unit form of annunciation element.

Figure 2:
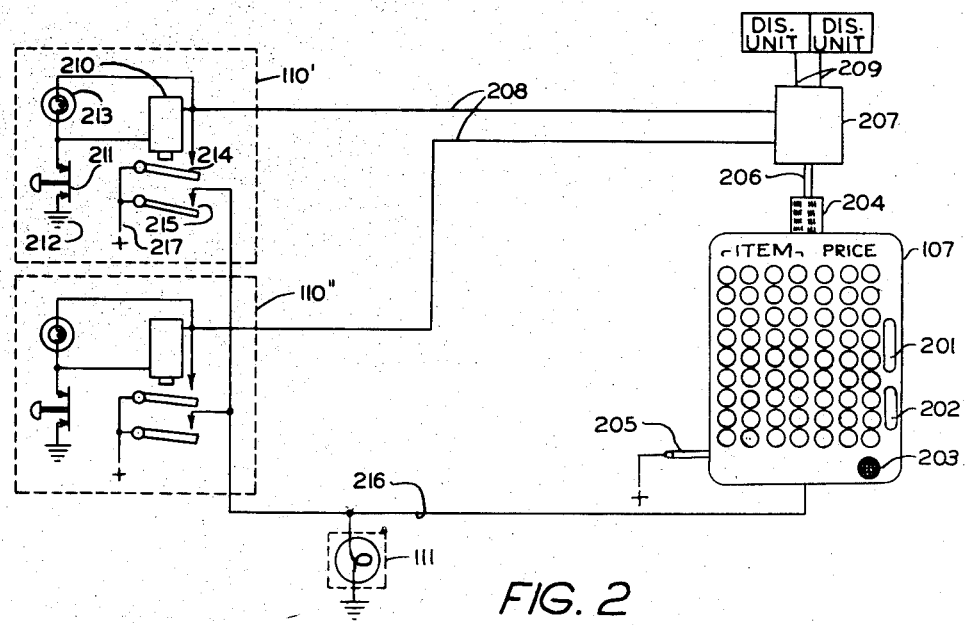
Fig. 2 is a schematic wiring diagram of the automatic annunciator arrangement associated with the storage compartments shown in Fig. 1.

Referring to the drawings, Fig. 1 illustrates a typical retail store installation embodying the invention. In this illustration, certain features of the mechanized selective control and delivery system are shown schematically for the sake of simplicity since they are shown in detail in my prior patents above referred to. The installation comprises a counter 101 over which packages of merchandise are passed to customers, the rear of said counter partially covering an intermittently moved order segregating conveyor belt 102 carried by supports 103 and 104. A recorder control station 107 is shown at the right hand end of the counter 101. This station is also illustrated in Fig. 2, and may be similar to that shown in detail in Patent No. 2,276,293. As explained in said patent, the control station unit comprises an adding machine of the recording type for printing a sales slip, as in the well known cash register, and mechanism for concurrently selectively controlling the circuits of the remote dispensing elements arranged to eject or dispense wanted articles from stock.

The selected items which are mechanically dispensed in a separate stock room are conveyed to the delivery point, such as a wrapping station, by travelling belts or other conventional means. For the sake of illustration, the conveyor system is shown herein as including a continuously moving belt 105 which passes through the housing 106 and carries the selected items to an apron 112 arranged to guide packages from the belt to the right hand section of the order segregating belt 102. The arrangement and purpose of the latter are described in Patent No. 2,276,294. The primary purpose of the order segregating belt is to keep the items of successive orders separate, and to this end the belt is intermittently advanced after the last item of each order is deposited thereon. Although this form of article-handling equipment has many advantages and is preferred, other conveying or handling equipment may be used in carrying out the invention. As will be explained below, the invention in one aspect relates to manual dispensing structure and apparatus, and to an interlocking control between such apparatus and mechanized order handling equipment of which a typical form is illustrated in Figs. 1 and 2.

A preferred arrangement of dispensing and control equipment for use in connection with the manual dispensing feature consists of a canopy or array of shelving 108 directly above the counter 101, said canopy containing a number of individual compartments for different merchandise articles. An assembly 110 comprising an annunciator lamp and a reset switch is mounted in a convenient location near the front of each compartment. The reset switch may be of the conventional spaced-contact type, consisting of a spring biased arm carrying a movable contact that may be depressed to "open" the relay holding circuit by the hand or arm of the clerk reaching into the compartment for a desired article. The operation of the reset switch is arranged to thus extinguish the annunciation element and perform other functions as explained hereinafter. A master pilot or indicator lamp 111 may also be provided, if desired, said lamp remaining lighted as long as any of the individual indicator lamps is lighted and thus indicating to the delivery clerk that all of the wanted items have not been selected from the canopy 108.

In operation, a customer requests the delivery of the items constituting an "order," as by presenting order tickets to a cashier who is stationed at the recorder control station 107. The order tickets each bear the name, item number and price of the particular article they represent, enabling the cashier to set up on the keyboard of the recorder control station the item number and price of wanted items from the data on the proffered order tickets. As explained in my prior patents, the control station mechanism prints the numbers and prices, as well as the total price, on a sales slip in the same way as a cash register with a number printing attachment; and at the same time the item number keys actuate a selectively controlled dispensing arrangement to release the wanted items from stock. When the "total" key 202 (see Fig. 2) is depressed to totalize the prices of the items in an order, the order segregating belt 102 is advanced, after a short time delay, to present an empty section of the belt for the next order. This may be accomplished by the mechanism described in my Patent No. 2,276,294, and therefore is only referred to herein for the purpose of explaining the general operation of the system. The sales slip printed by the recorder serves as a receipt since it shows the item number and price of each individual item in an order as well as the total price, and would be presented to the customer when the order is paid for. The purchased items, if obtainable from the mechanized order handling equipment, will be automatically deposited on the belt 102, and may be bagged or wrapped for the customer as the payment is being made.

However as pointed out above there are occasional items which do not lend themselves to mechanized dispensing or which are handled on such a temporary basis that installation of mechanized dispensing equipment therefor would not be justifiable. It is for the handling of such items that the features of the present invention have been conceived and developed. As a result of this development, the cashier may put through complete orders without regard as to whether or not the individual items are stocked in the mechanized stockroom. Those which are, as previously explained, will be delivered forthwith and those which are not, will be indicated to the delivery clerk by the lighting up of the annunciator lamp (or operation of an equivalent indicator) in the compartment in which the desired item is stored. In reaching for the item, the delivery clerk brushes his arm against the bar of the reset switch thus causing the associated annunciator lamp to be extinguished. Since the operation of the "total" key of the recorder-control station causes the order segregating belt 102 to be advanced for the next succeeding order, this key may be locked against actuation as long as any annunciator lamp is lighted. This feature provides a simple and effective guard against mixing up the items of different orders and simplifies the duties of the clerk.

As shown in Fig. 2, the keyboard of the recorder-control station 107 includes an "add" key 201 which is depressed to effect recording of the item number and price of each individual selected item on the sales slip 204. The "total" key 202 referred to above is depressed to cause the accumulation of individual item prices to be recorded. A pilot lamp 203 which remains lighted as long as the "total" key 202 is locked against actuation may also be provided for the cashier. As described in detail in my prior patents, a source of power is connected through cable 205, the contacts of the operated item number keys, cable 206 and the relays of the relay group 207 to selected circuits 208, 209. Circuits 208 extend to the indicators associated with the manual dispensing structure, whereas circuits 209 extend to remote controlled units of the mechanized dispensing system. Thus either a selected item is automatically delivered to the order assembly point from the stockroom or an indicator is operated in the case of an item stored in one of the compartments 109.

If it is assumed that the circuit to the winding of relay 210 is closed, the energization of the relay closes a circuit through its armature 214 to battery connected to conductor 217, which maintains the relay locked up and the annunciator lamp 213 lighted after the relay system 207 is restored to normal. The relay 210 also closes a circuit through its armature 215 for supplying battery potential to conductor 216. Thereupon the master pilot lamp 111 and auxiliary pilot lamp of bull's-eye 203 become lighted. As shown in Fig. 3, a locking magnet 218 is also connected to the conductor 216 and becomes energized whenever any one of the annunciator lamps 213 is selected since the conductor 216 is multipled to all of the relays corresponding to relay 210. The energization of magnet 218 actuates its armature 220 which is arranged to move to a position where it obstructs the movement of the "total" key 202, thus preventing the key from being operated. It will be apparent therefore that the key 202 is locked against actuation and the pilot lamps 111 and 203 remain lighted as long as any of the relays 210 are energized. As each item is taken from a compartment 109, the opening of the reset switch 211 releases the associated relay 210 and extinguishes the annunciator lamp 213; and when all of the annunciator lamps have been extinguished in this manner, battery is removed from the conductor 216, and the lamps 111 and 203 are extinguished and the locking-magnet 218 becomes deenergized. The "total" key 202 may now be actuated to complete the recording on the sales slip and to cause the advance of the order segregating belt 102.

It will be apparent that the combined system for both mechanized and manual dispensing of articles in accordance with the invention possesses several advantages over a completely mechanized system. It is easier to install and maintain, and enables the handling of items which are uneconomical or even impossible to handle from a practical standpoint with mechanical dispensing apparatus. This is accomplished without sacrificing speed or efficiency, and without requiring the operator or clerk to distinguish between manually and automatically dispensed items. Thus his duties are largely routine and the requirement for trained help of better-than-average mentality, as typified by checking cashier of a large store, is eliminated.

The system shown in Figs. 1–3 represents a preferred embodiment of the invention but various modifications in the detailed structure and arrangement of the elements of the system can be made without departing from the scope of the invention. For example, the construction of the control and mechanized assembly elements and of the annunciator or indicator units may obviously be widely varied without changing the essential principles involved. Furthermore the interlocking of the indicator system with the control station may be effected in various ways. Thus instead of preventing or delaying the final step of the control operation—totalizing and issuing the sales slip—until the indicators are all restored, the initiation of the succeeding control cycle may be made dependent upon the restoration of the indicators. This arrangement has the advantage that the payment and making of change may be accomplished immediately upon the completion of the control operation, during which time the final assembly steps can be carried out by the delivery clerk.

Figure 4:
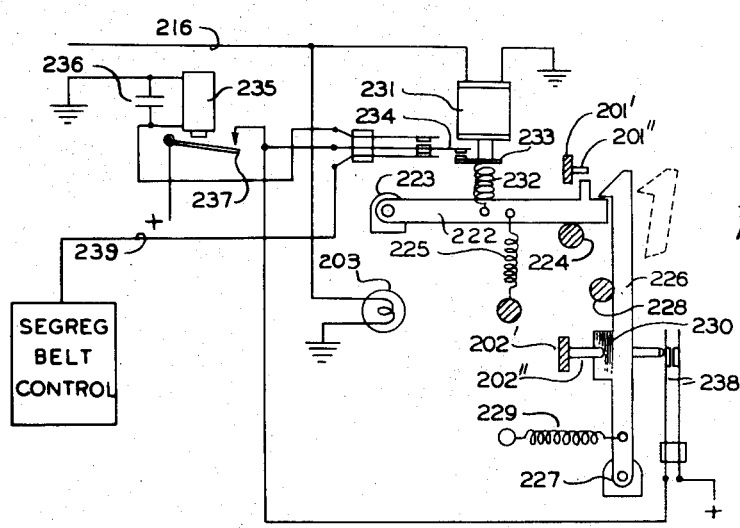
Fig. 4 is a view of a modified system arranged to provide a different interlock between the manual and mechanized assembly systems.

This modification is illustrated in Fig. 4, which illustrates a portion of a control station to be employed in a system such as that shown in Figs. 1 and 2. Referring to this figure, 201' and 202' represent extensions of the actuating bars of the "add" key 201 and "total" key 202, respectively. The elements 201' and 202' are provided with lugs 201'' and 202'' which are mechanically interlocked in such a manner that after the "total" key has been actuated, the "add" key cannot be actuated if any of the annunciators at the delivery station remain unacknowledged. This delays the recording of the first item on the next succeeding order (since the "total" key is actuated at the end of each control cycle) until all of the manually dispensed items have been picked up. As shown, the lug 202'' controls a latch bar 226 pivoted at 227 and normally held against a backstop 228 by a spring 229. An interlock lever 222, normally held by the latch bar 226, is pivoted at 223 and held in engagement with the backstop 224 by a spring 225, unless the magnet 231 is energized. When the magnet is energized, a strong spring 232 connecting the magnet armature and the lever 222 will be placed under tension. Since the magnet 231 is connected to conductor 216 (see Fig. 2), this condition obtains as long as any of the annunciators 213 remain lighted, indicating that manually dispensed items on order have not been taken. After the actuation of the "total" key 202 has released the latch bar 226, if the magnet 231 still remains energized, the interlock lever 222 is raised by the magnet to obstruct movement of the lug 201'' on the "add" key and thereby prevent actuation of the key until all of the indicators or lamps have been restored. Thus the initiation of a succeeding control cycle is delayed until the complete order, including manually dispensed items, has been handled.

It is also desirable to delay the progressive movement of the order segregating belt 102 until the complete order has been assembled on the first section thereof. As described in my prior Patent No. 2,276,294, the movement of the belt is initiated by a current impulse applied to the magnet 109 of Fig. 3 of said patents. Assuming that this magnet is connected to conductor 239, it will be noted that a circuit is closed from this conductor through the lower contacts of the transfer contact pile-up 234 and contacts 238 (closed by the latch bar 226) to battery as soon as the "total" key 202 is actuated, if magnet 231 is deenergized. If however the magnet 231 is energized when the "total" key is actuated, indicating that all of the manually dispensed items of an order have not been picked up, the closure of contacts 238 closes a circuit through the upper transfer contacts 234 for operating relay 235, and said relay locks up through its armature 237, the locking circuit being independent of the contacts 238. The relay 235 is slow-to-release, as by the provision of a shunt condenser 236. When the annunciators are restored and magnet 231 becomes de-energized, an impulse of current is applied to conductor 239 through the armature 237 of relay 235 and the lower transfer contacts 234 associated with magnet 231. Thus the step-by-step progression of the order segregating belt 102 is delayed until after all items of the order are dispensed.

It will be noted that different "order numbers" may be utilized to indicate different quantities of a given article, and that the actuation of a particular annunciation element 110 would call for but one of a particular article, whereas the actuation of a different annunciation element would call for a different quantity (say one quarter dozen) of that particular article. Where it may be desirable to call for multiple quantities of a particular article, through multiple actuations of the system, a multi-unit form of annunciation element as illustrated by Figs. 5 and 6 has been developed. It may be used interchangeably with annunciation elements 110, being actuated by the control station 107 through conductor 208, and, in turn actuating the control station restraining means as illustrated by either Fig. 3 or Fig. 4, through conductor 216.

Fig. 6 is a front elevation of a multi-unit form of annunciation element. 260 is a bull's-eye which is illuminated whenever the element has been actuated and not reset. 258 refers to a window in front plate of the element through which a character on an indicator drum is visible which indicates the number of successive actuations of the element since last restoration. 263 is a restoration button which, when depressed, causes the bull's-eye lamp to be extinguished and the indicator drum to return to its home position showing the zero character (0) through window 258.

In Fig. 5, 251 represents the indicator drum around whose periphery are consecutive numerals 0, 1, 2, 3, etc., so placed as to be visible one at a time, through window 258. Retractile spring 256 is so arranged as to bring indicator drum to the "home" or "zero" position when reset button 263 is depressed. Electromagnet 253, which may be actuated by electrical pulses coming from control station 107 through conductor 208, is so arranged that upon each actuation it causes ratchet pawl 252 to engage ratchet wheel associated with drum 251 one step, thereby advancing same to display the next consecutive number through window 258. As each step is made, holding pawl 254 prevents return of drum 251 to the home position as it would tend to do when stepping pawl 252 is retracted by electromagnet 253 becoming de-energized. It will be noted that reset button 263, when depressed, actuates holding pawl 254 causing it to free ratchet wheel permitting spring 256 to return indicator drum to home position.

It will be noted that when drum 251 is in the "home" position as shown by Fig. 5, a pin thereon holds contacts 255 in an "open circuit" condition.

When control station 107 is actuated to signal for an article associated with a particular annunciation element of the character illustrated by Fig. 5, the pulse of current through conductor 208 causes indicator drum 251 to be advanced one step exposing the numeral "1" through window 258. At the same time closure of contacts 255 caused by movement of 251 permits a current flow of current through these contacts to indicator lamp 261, also through conductor 216 to actuate the restraining element of control station 107 previously described. Subsequent similar actuations of control station 107 will advance indicator drum 251 a corresponding number of steps thereby exposing a numeral corresponding to the number of actuations. The delivery clerk noting a lighted indicator lamp, scans the exposed numeral associated therewith, removes a corresponding quantity of that particular article and deposits same on right hand section of order segregating belt. In the course of doing this he presses the reset button 263 which causes the bull's-eye lamp 261 to be extinguished, the indicator drum to return to its home position (0) and the conductor 216 de-energized thus extinguishing also bull's-eye 203 on control station 107 and releasing the restraining means thereon.

Various other modifications in the system shown for the purpose of explaining the invention may be made without departing from the scope thereof as defined in the appended claims.

I claim:

1. In an article order assembly system, a control station for selecting desired articles for separate individual orders, said station including a keyset for setting up information respecting the items of each order and a member to be operated at the beginning or end of the series of operations of the keyset representing each order, storage compartments in which articles are stored, annunciation elements associated with such compartments, means including the control station for selectively operating annunciation elements associated with articles to be selected, reset means for the annunciation elements, and means at the control station responsive to actuated annunciations which have not been reset for locking the said member at the control station against operation.

2. In an article order assembly system, a control station for selecting desired articles for separate individual orders, said control station including a keyset storage compartments in which articles are stored, annunciation elements associated with such compartments, means including the control station keyset for selectively operating annunciation elements associated with articles to be selected, means at the control station operable from said compartments to indicate when all of the selected articles have been taken to complete an order, mechanized article dispensing equipment and means including said control station keyset for selectively operating said mechanized equipment.

3. A combined article order assembly system of the class described comprising a mechanized system including a selective control station, a manual handling section provided with compartments in which manually dispensed articles are stored, and interlocking control means for the mechanized system and manual section, said means comprising signaling and control elements adjacent the manual section arranged to be controlled by and to restrain the operation of said selective control station of the mechanized system.

4. A combined article order assembly system of the class described comprising a mechanized system including a selective control station provided with an adding machine having a "total" key, a manual handling section provided with compartments in which manually dispensed articles are stored, annunciation elements adjacent said compartments, means including said selective control station for operating the annunciation elements associated with articles to be selected and means operatively associated with said annunciation elements for locking said "total" key at the control station against operation to delay handling of a succeeding order until said elements are restored to normal.

5. In a system of the character described, the combination with a mechanized order assembly system and a selective control station arranged to operate the same and thereby select the items of successive orders, of a plurality of compartments for storing items for manual handling, indicator units for the respective compartments, means for operating said units from the control station, manually operable switching means for restoring the indicator units to the unoperated condition and a master indicator unit at the control station connected in parallel with all of the other indicator units.

6. In a system of the character described, the combination with a mechanized order assembly system and a selective control station arranged to operate the same and thereby select the items of successive orders, of a plurality of compartments for storing items for manual handling, indicator units for the respective compartments, means for operating said units from the control station and control means adjacent said indicator units for altering the normal operation of said control station whereby the operation of the mechanized assembly system is also controllable thereby.

7. In an article order assembly system, a control station for selecting desired articles for separate individual orders, mechanized article dispensing equipment controlled by said control station, storage compartments in which articles are stored, annunciation elements and electrical switches associated with said compartments, means including said control station for selectively operating the annunciation elements associated with the compartments containing articles to be selected, and means at said control station controlled by said switches for indicating the progress made in the fulfillment of an order.

8. In an article order assembly system, a control station for selecting desired articles for separate individual orders, said control station including a keyboard having "price," "add" and "total" keys, storage compartments in which articles are stored, annunciation elements associated with said storage compartments, means including said control station for selectively operating the annunciation elements associated with the compartments containing articles to be selected, reset means for the annunciation elements and means responsive to the reset means for locking the "total" key against operation until all of the operated annunciation elements have been reset.

9. In an article order assembly system, a control station for selecting desired articles for separate individual orders, said control station including a keyboard having "price," "add" and "total" keys, storage compartments in which articles are stored, annunciation elements associated with said storage compartments, means including said control station for selectively operating the annunciation elements associated with the compartments containing articles to be selected, reset means for the annunciation elements and means responsive to the reset means for locking the "add" key against operation, after the "total" key is actuated, until all of the operated annunciation elements have been reset.

10. In an article order assembly system, storage compartments in which articles are stored, annunciation elements associated with said compartments, means for operating the annunciation elements of compartments containing selected articles, means for resetting the annunciation elements when articles have been taken from their compartments in assembling an order, an order segregating support, means for advancing said support to present an empty section for subsequently selected articles and means responsive to the reset means for delaying the advance of said support until all of the annunciation elements have been reset.

11. In an article order assembly system, a control station including a machine provided with registering mechanism and manually operable selecting and operating keys, mechanized article dispensing equipment controlled thereby, storage compartments in which articles are stored, annunciation elements and electrical switches associated with said compartments, means including said selection keys for selectively operating the annunciation elements associated with the compartments containing articles to be selected and means for locking one of said operating keys against operation until the switches associated with selected compartments have been operated.

12. In an article order assembly system, a control station including a plurality of manually operable selecting and operating keys, mechanized article dispensing equipment controlled thereby, storage compartments in which articles are stored, annunciation elements associated with said compartments, reset means for said annunciation elements, means including said manually operable selecting keys for selectively operating the annunciation elements associated with the compartments containing articles to be selected and means to lock one of said operating keys against operation until all operated annunciation elements have been reset.

13. In an article order assembly system, a control station for selecting desired articles for separate individual orders, said control station comprising a mechanism for selectively closing circuits corresponding to the wanted items of an order and means for printing individual and accumulated total prices of the items of each order, storage compartments in which articles are stored, electroresponsive means associated with each of said compartments and connected to said selective mechanism to designate wanted items, means to restore said electroresponsive means to the unoperated condition and means to restrain the operation of an element of said price printing means at the control station as long as any of said electroresponsive means remain operated at the end of an order as indicated by operation of the total price printing means.

14. In an article order assembly system, a control station for selecting desired articles for separate individual orders, storage compartments in which articles are stored, annunciation elements one located at each of said compartments, means including the control station for selectively operating any of said annunciation elements irrespective of the operated condition of another of said elements, means for individually resetting each of said elements and indicator means at the control station responsive to any annunciator in operated condition.

15. In an article order assembly system, a control station for selecting desired articles for separate individual orders, storage compartments in which articles are stored, annunciation elements associated with said compartments, electrical circuits between said control station and the respective annunciation elements, means including the control station for selectively operating any of said annunciation elements irrespective of the operated condition of another of said elements, to designate articles to be selected, and means including said circuits to indicate at the control station when all of the selected articles have been taken to complete an order.

16. In an article order assembly system, a control station, remote storage compartments in which articles are stored, annunciation elements one located at each of said compartments, means at the control station for selectively operating any of said annunciation elements associated with articles to be selected irrespective of the operated condition of another of said elements, means including a reset button adjacent each annunciation element for resetting the same, indicator means at the control station and means responsive to the reset buttons of compartments having operated annunciation elements for operating said indicator means.

PAUL M. FARMER.

REFERENCES CITED

The following references are of record in the file of this patent:

UNITED STATES PATENTS

| Number | Name | Date |
| --- | --- | --- |
| 1,796,668 | Sarfarty | Mar. 17, 1931 |
| 1,872,110 | Brand | Aug. 16, 1932 |
| 1,625,490 | Morris | Apr. 19, 1927 |
| 2,343,268 | Wheeler | Mar. 7, 1944 |
| 2,276,293 | Farmer | Mar. 17, 1942 |